Figure 1:
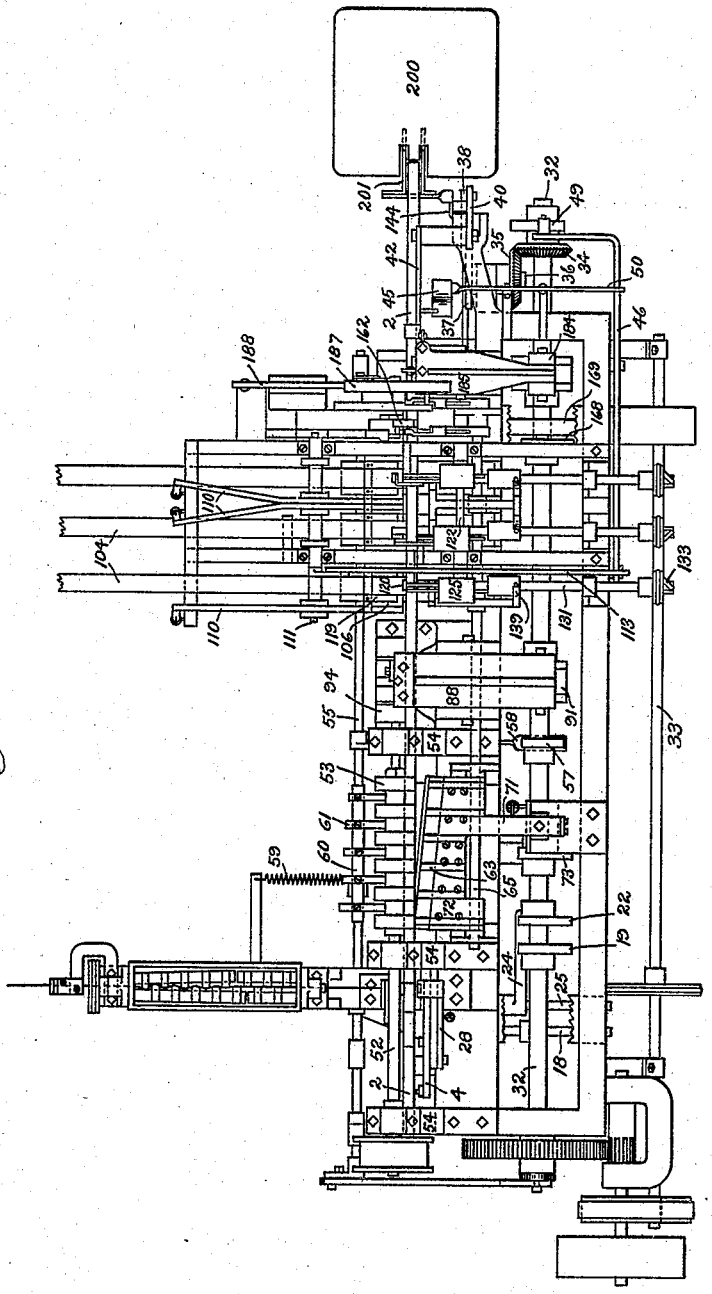

J. MAITLAND, DEC'D.
I. MAITLAND, EXECUTRIX.
MACHINE FOR MAKING SPRING KNITTING NEEDLES.
APPLICATION FILED OCT. 18, 1907.

930,978.

Patented Aug. 10, 1909.
16 SHEETS—SHEET 1.

Witnesses:
John W. Fisher

Inventor
John Maitland
By Walter E. Ward
Attorney.

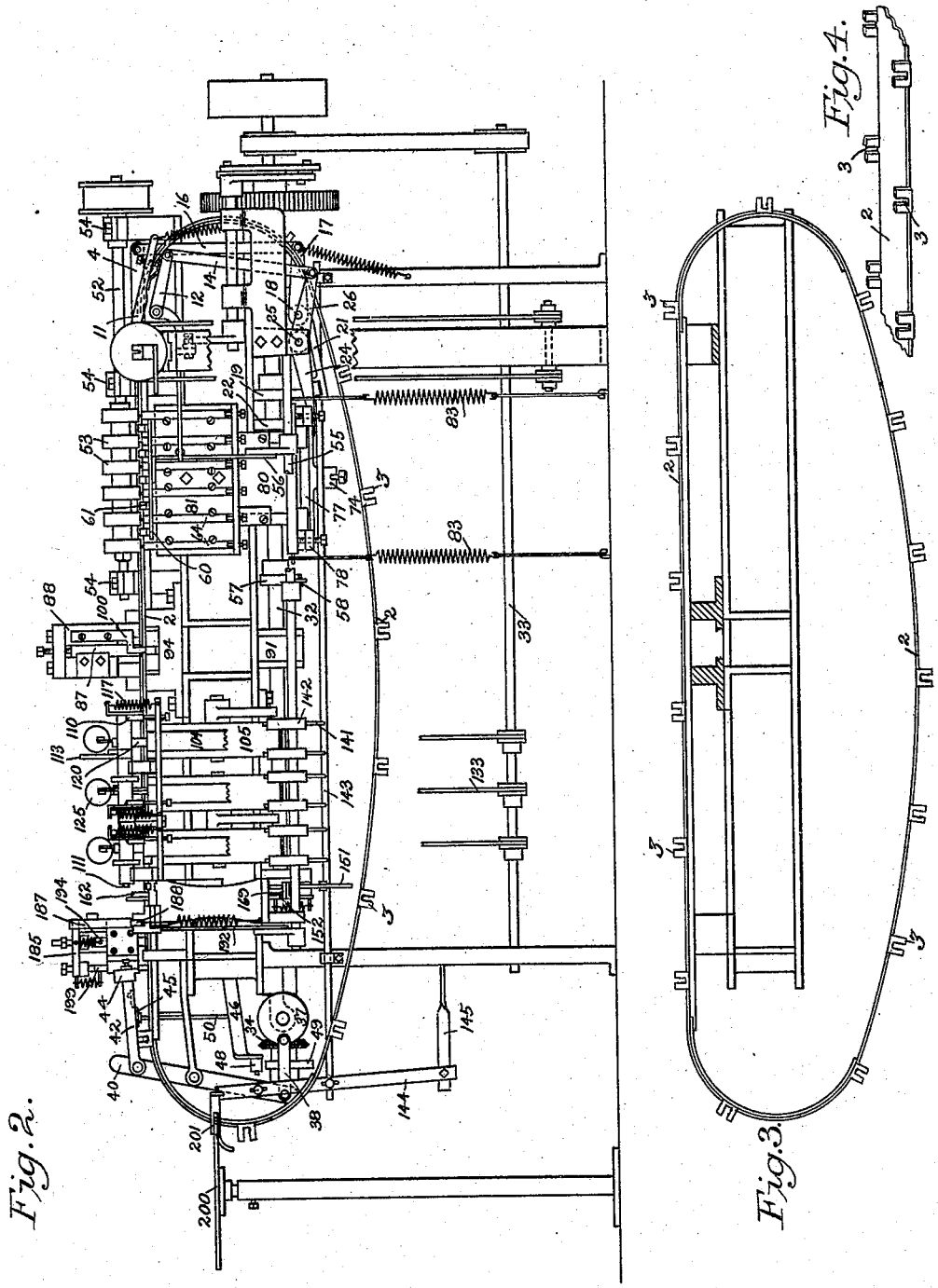

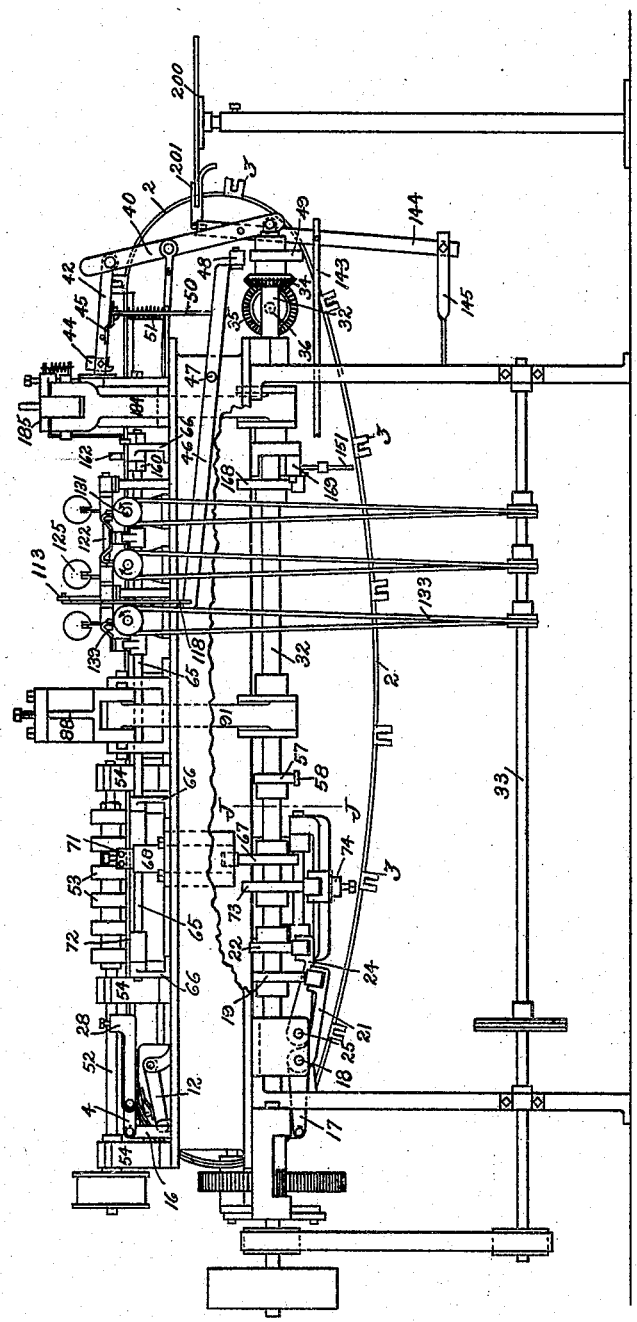

J. MAITLAND, DEC'D.
I. MAITLAND, EXECUTRIX.
MACHINE FOR MAKING SPRING KNITTING NEEDLES.
APPLICATION FILED OCT. 18, 1907.
930,978.
Patented Aug. 10, 1909.
16 SHEETS—SHEET 4.
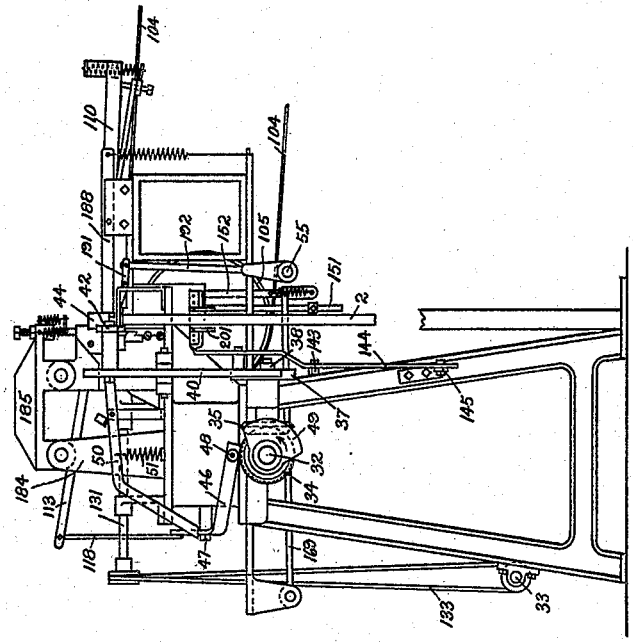
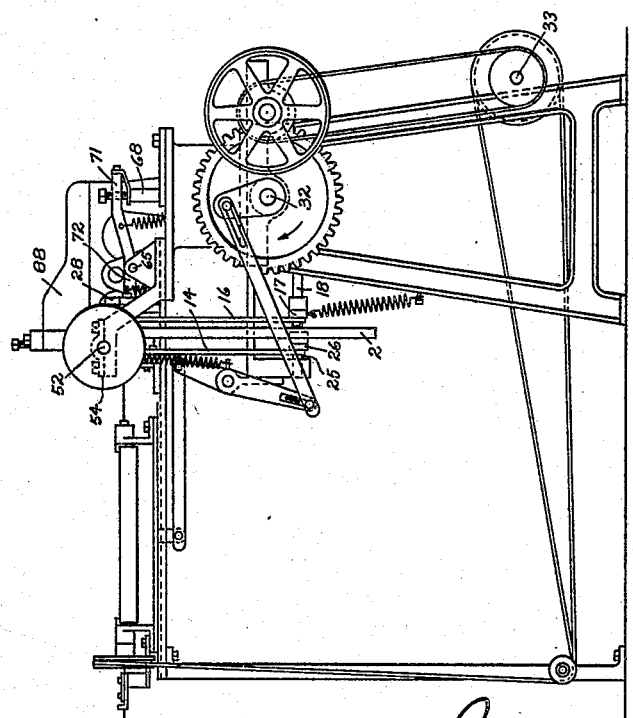
Witnesses:
John W. Fisher
Inventor,
John Maitland
By Walter E. Ward,
Attorney.

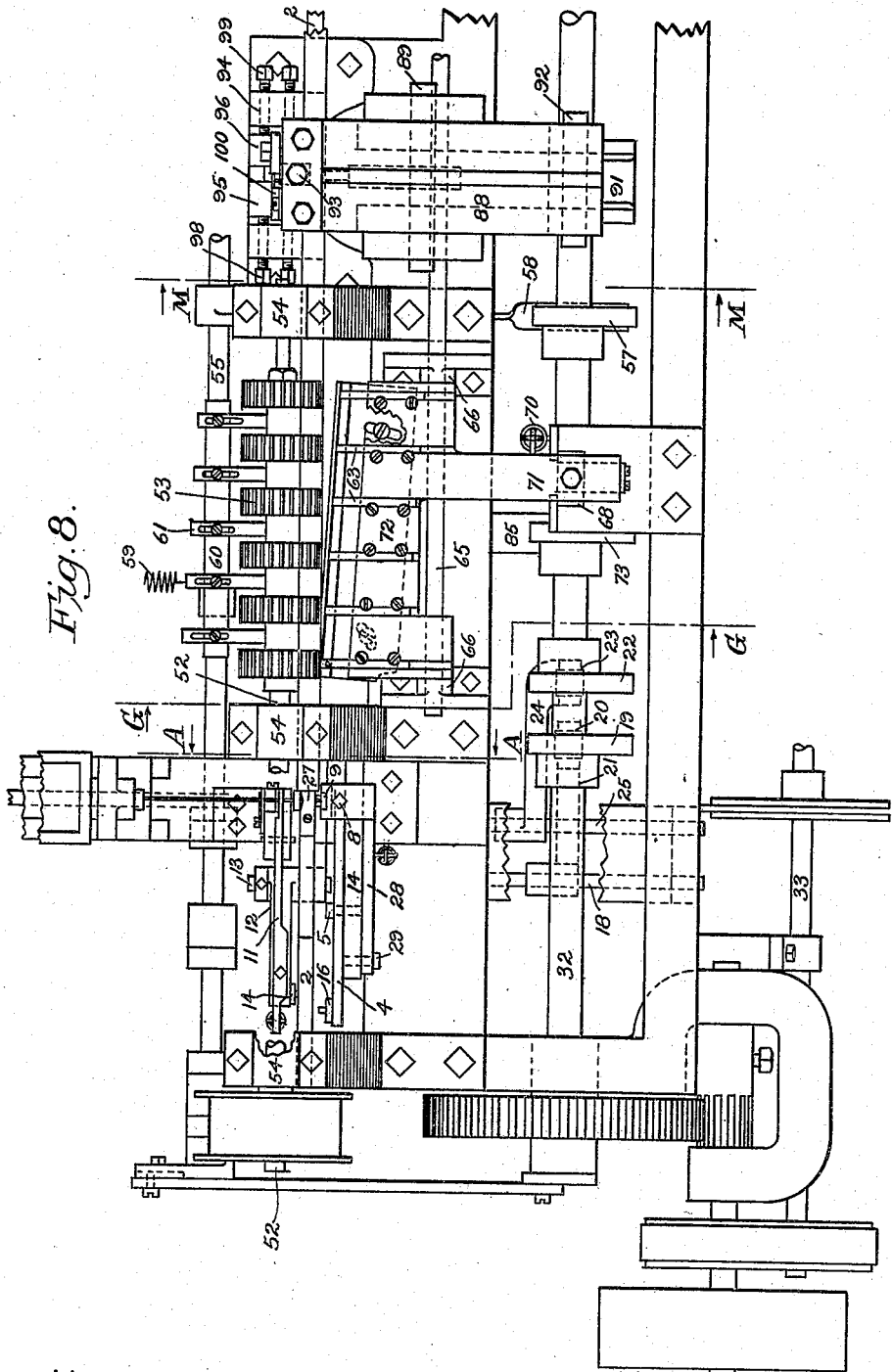

J. MAITLAND, DEC'D.
I. MAITLAND, EXECUTRIX.
MACHINE FOR MAKING SPRING KNITTING NEEDLES.
APPLICATION FILED OCT. 18, 1907.
930,978.
Patented Aug. 10, 1909.
16 SHEETS—SHEET 6.
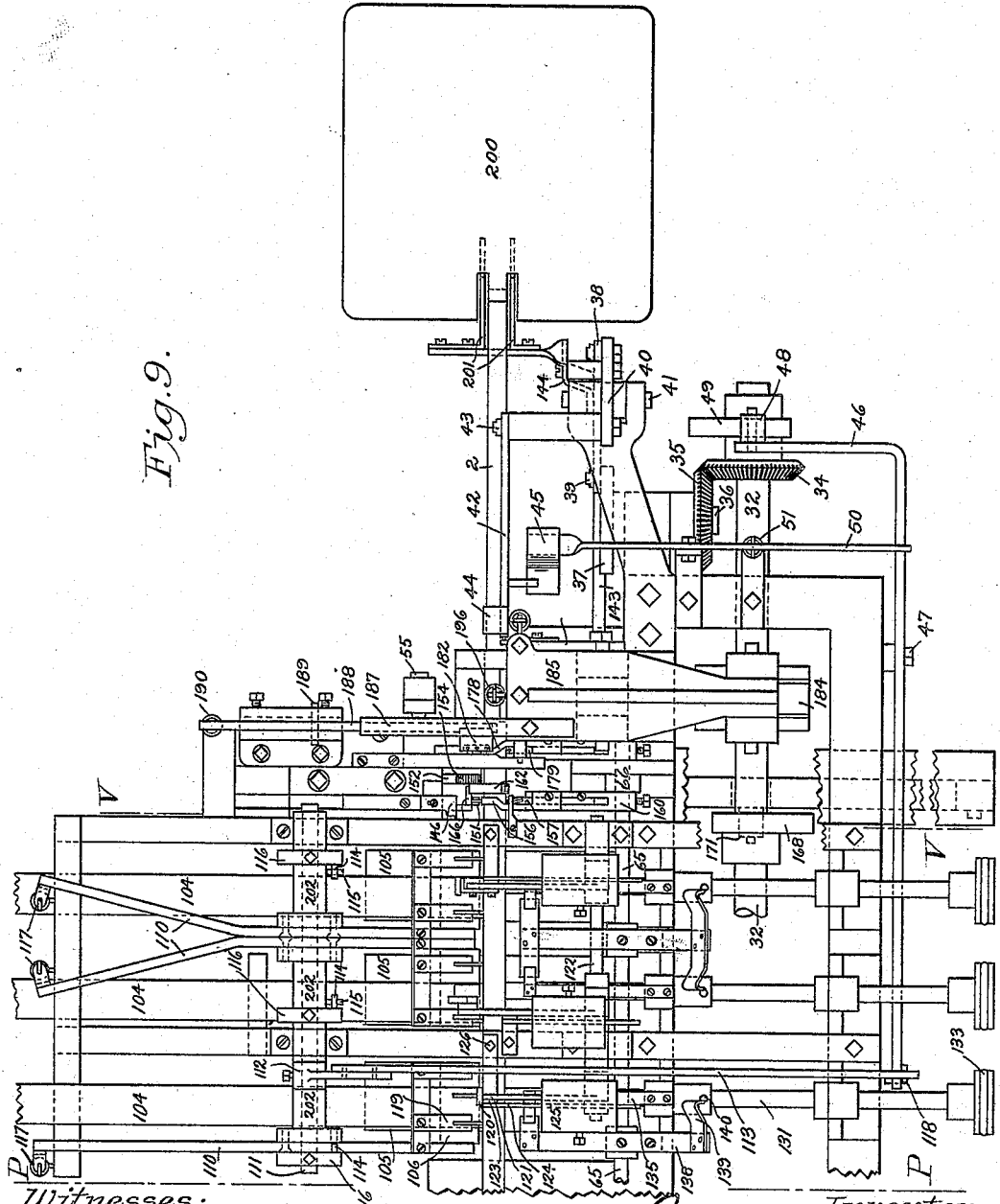

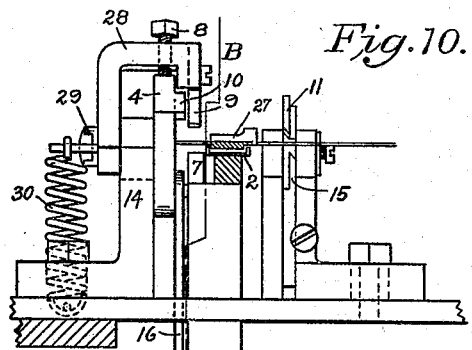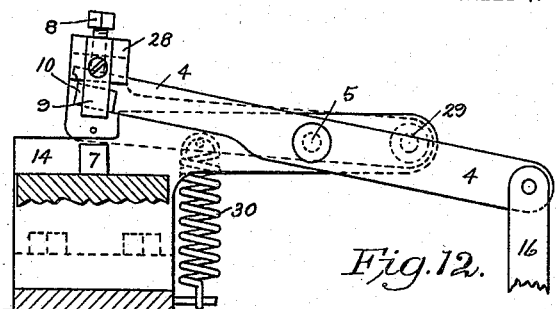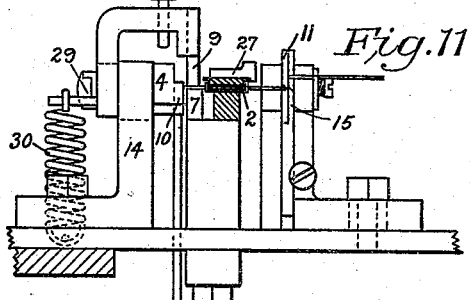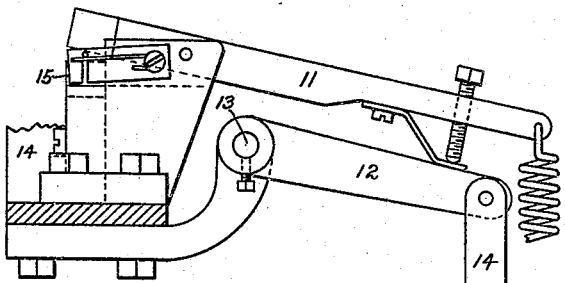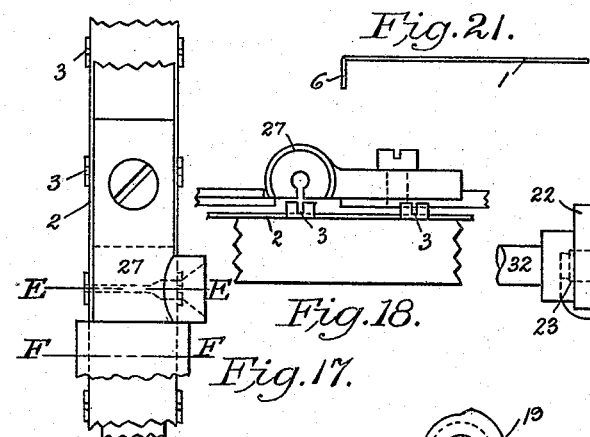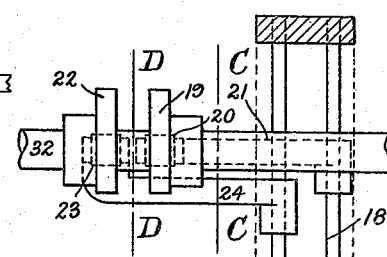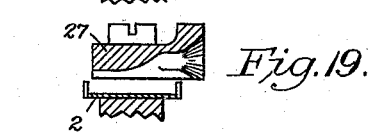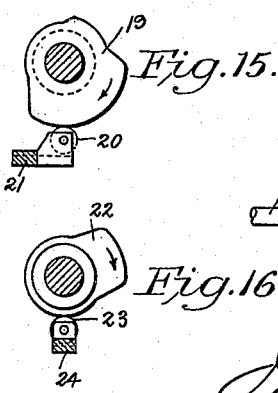

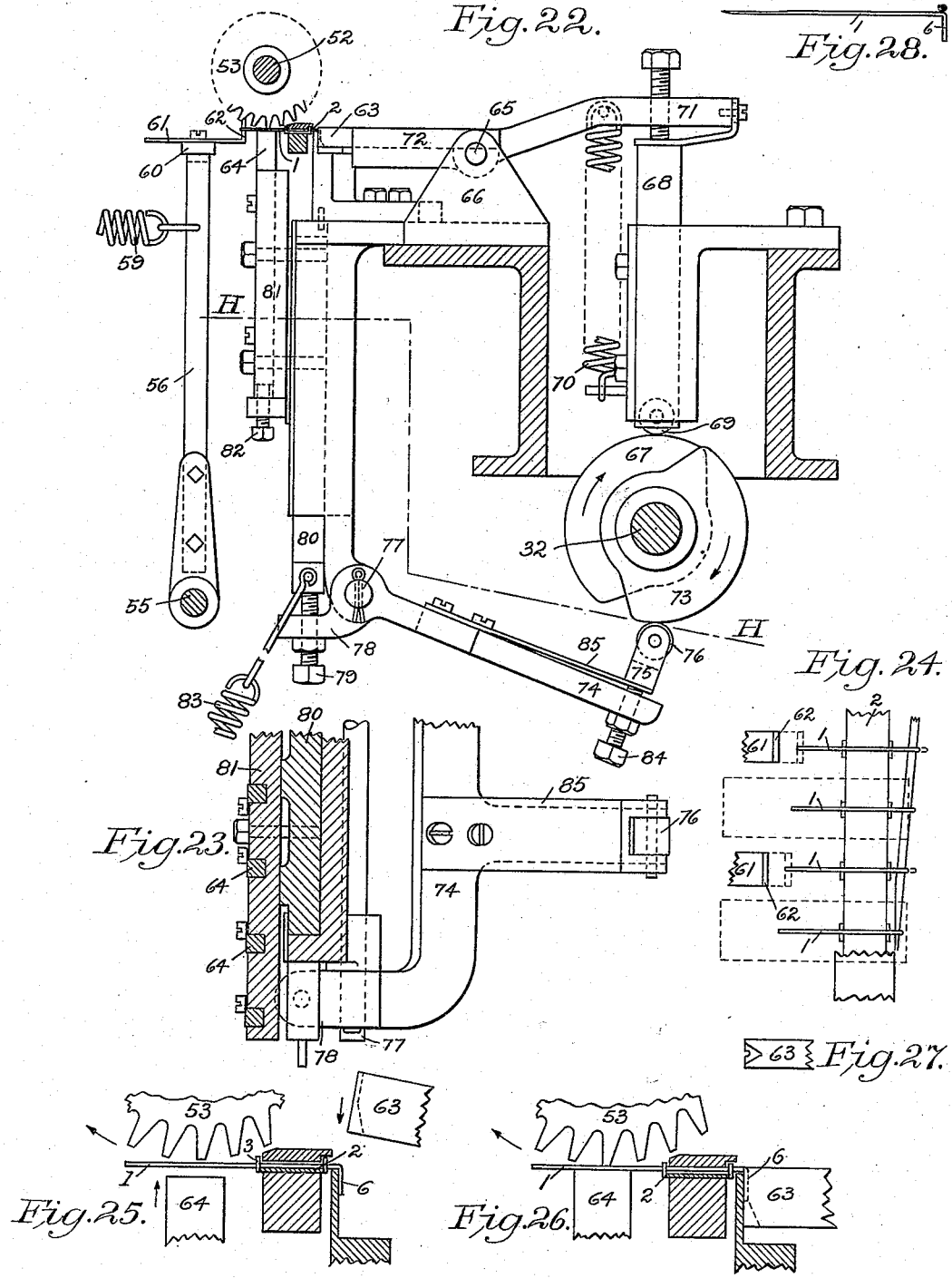

J. MAITLAND, DEC'D.
I. MAITLAND, EXECUTRIX.
MACHINE FOR MAKING SPRING KNITTING NEEDLES.
APPLICATION FILED OCT. 18, 1907.
930,978.
Patented Aug. 10, 1909.
16 SHEETS—SHEET 9.
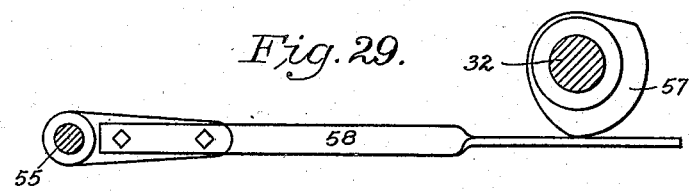
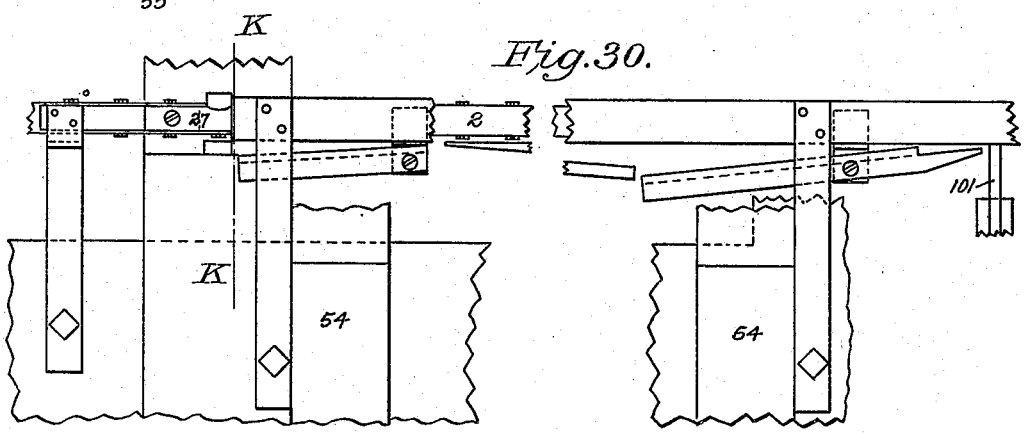
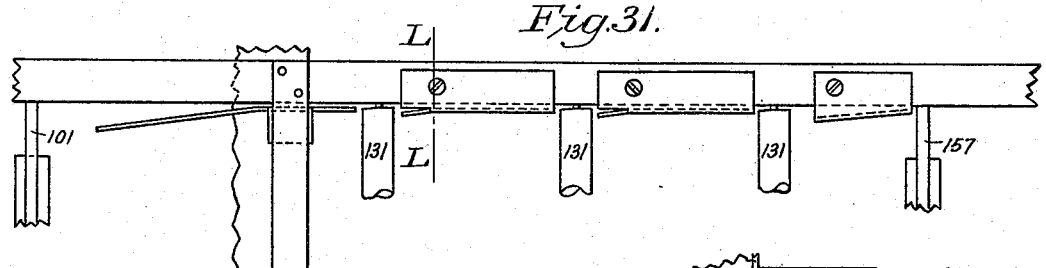
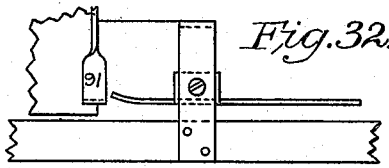
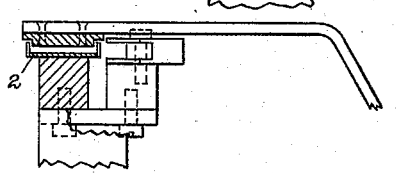
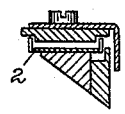
Witnesses:
John W. Fisher
Inventor,
John Maitland
By Walter E. Ward
Attorney.

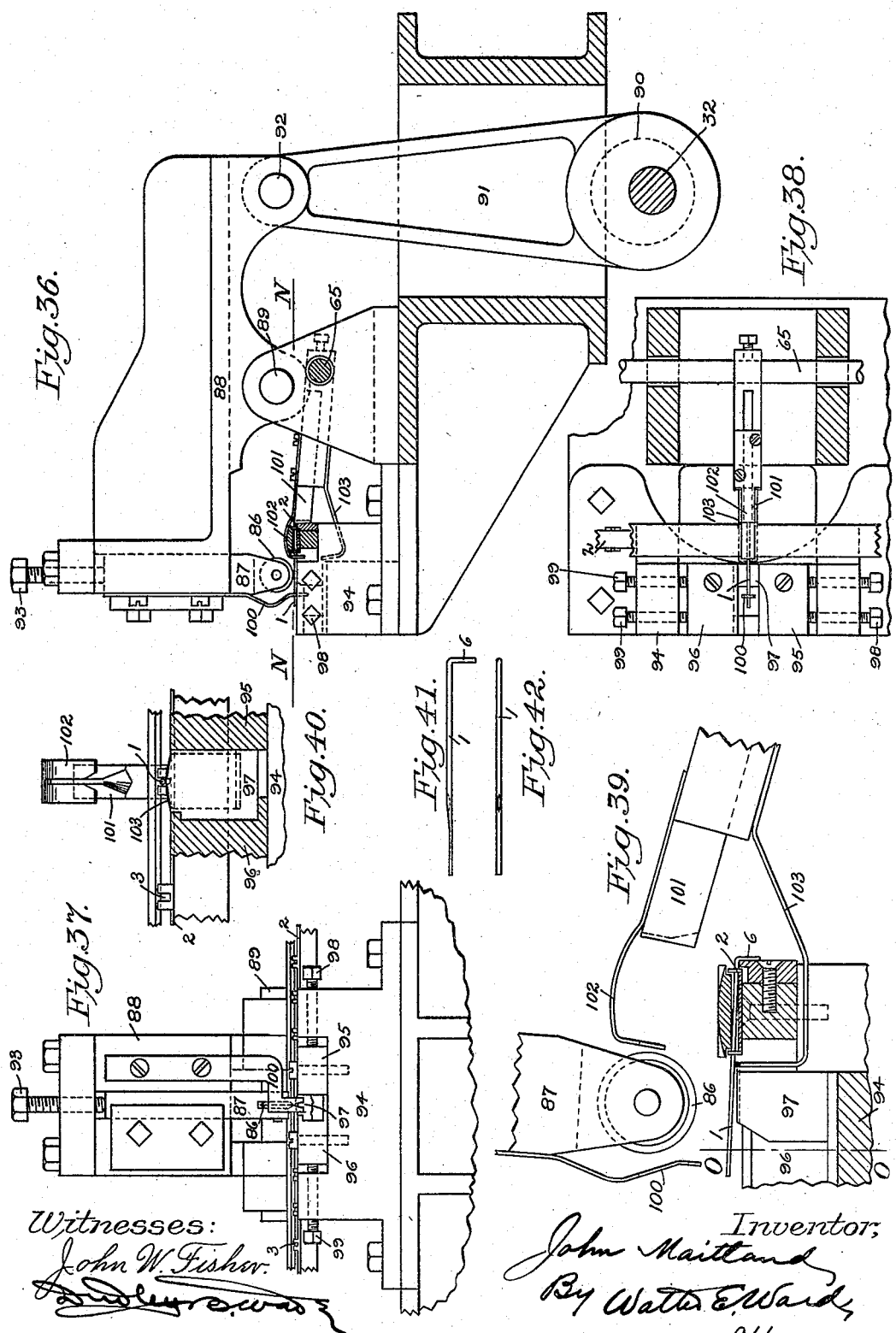

J. MAITLAND, DEC'D.
I. MAITLAND, EXECUTRIX.
MACHINE FOR MAKING SPRING KNITTING NEEDLES.
APPLICATION FILED OCT. 18, 1907.
930,978.  Patented Aug. 10, 1909.
16 SHEETS—SHEET 11.
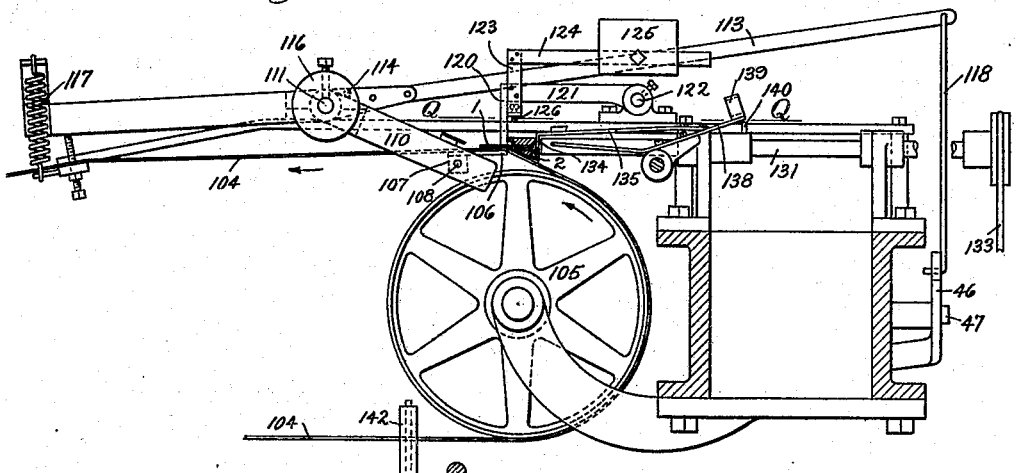
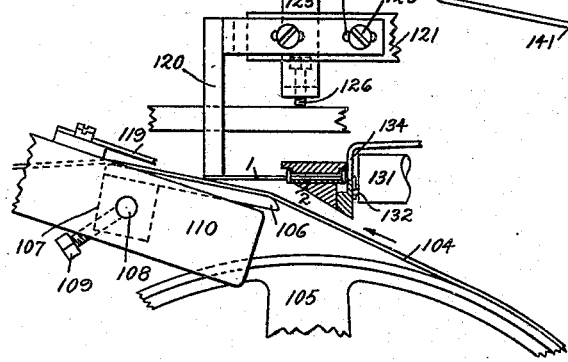
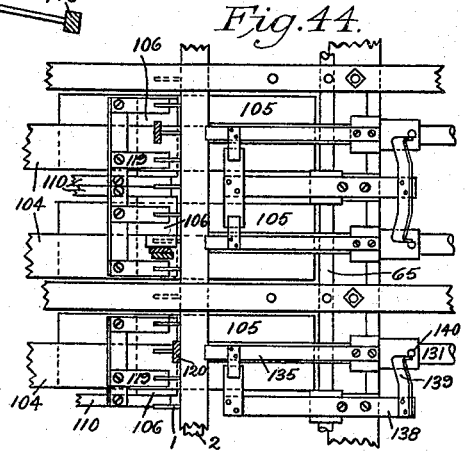
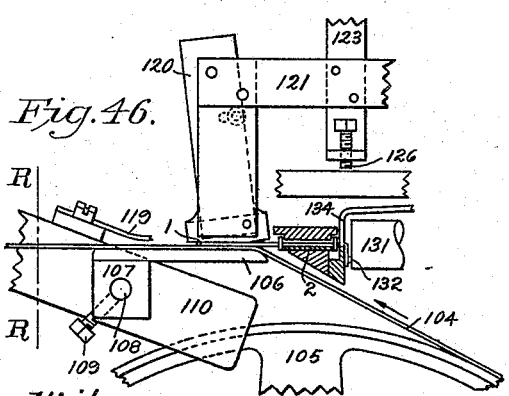
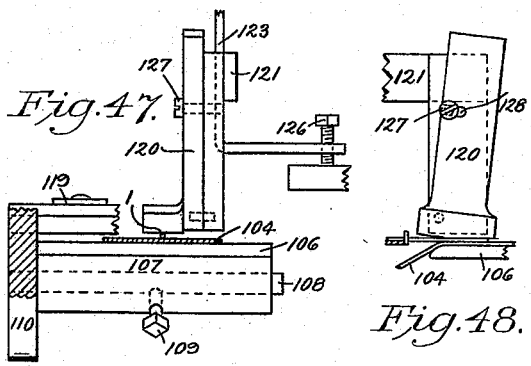
Witnesses:
John W. Fisher
Inventor;
John Maitland
By Walter E. Ward
Attorney.

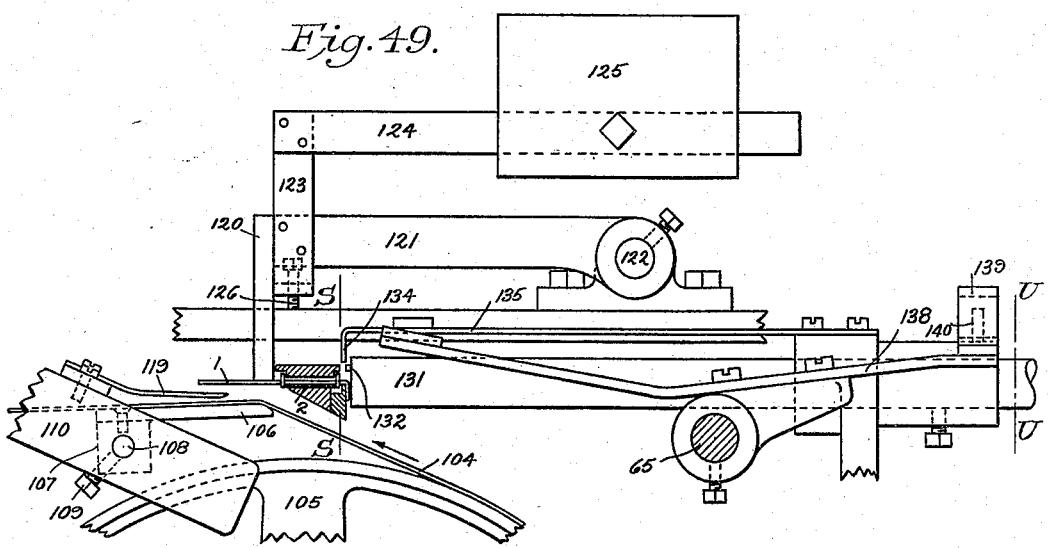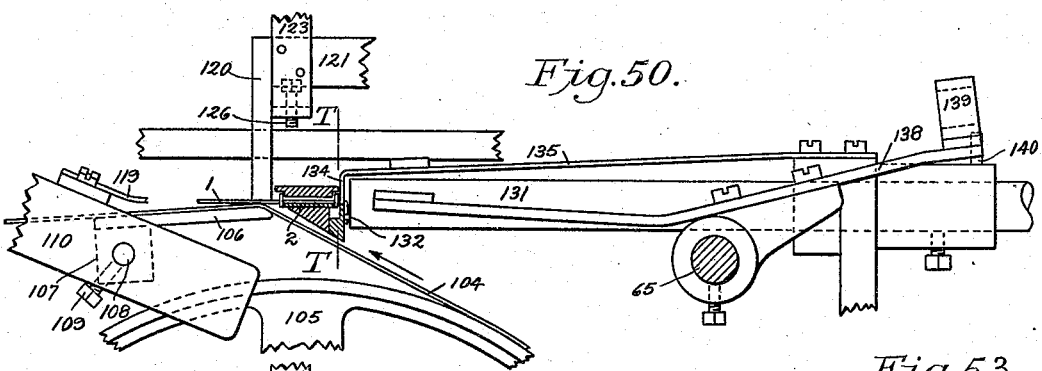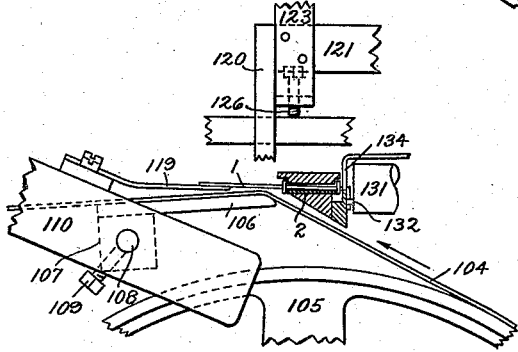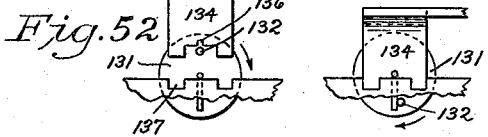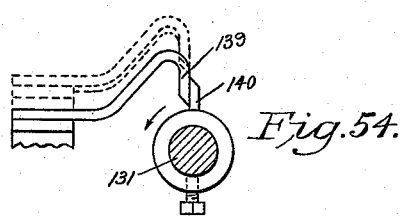

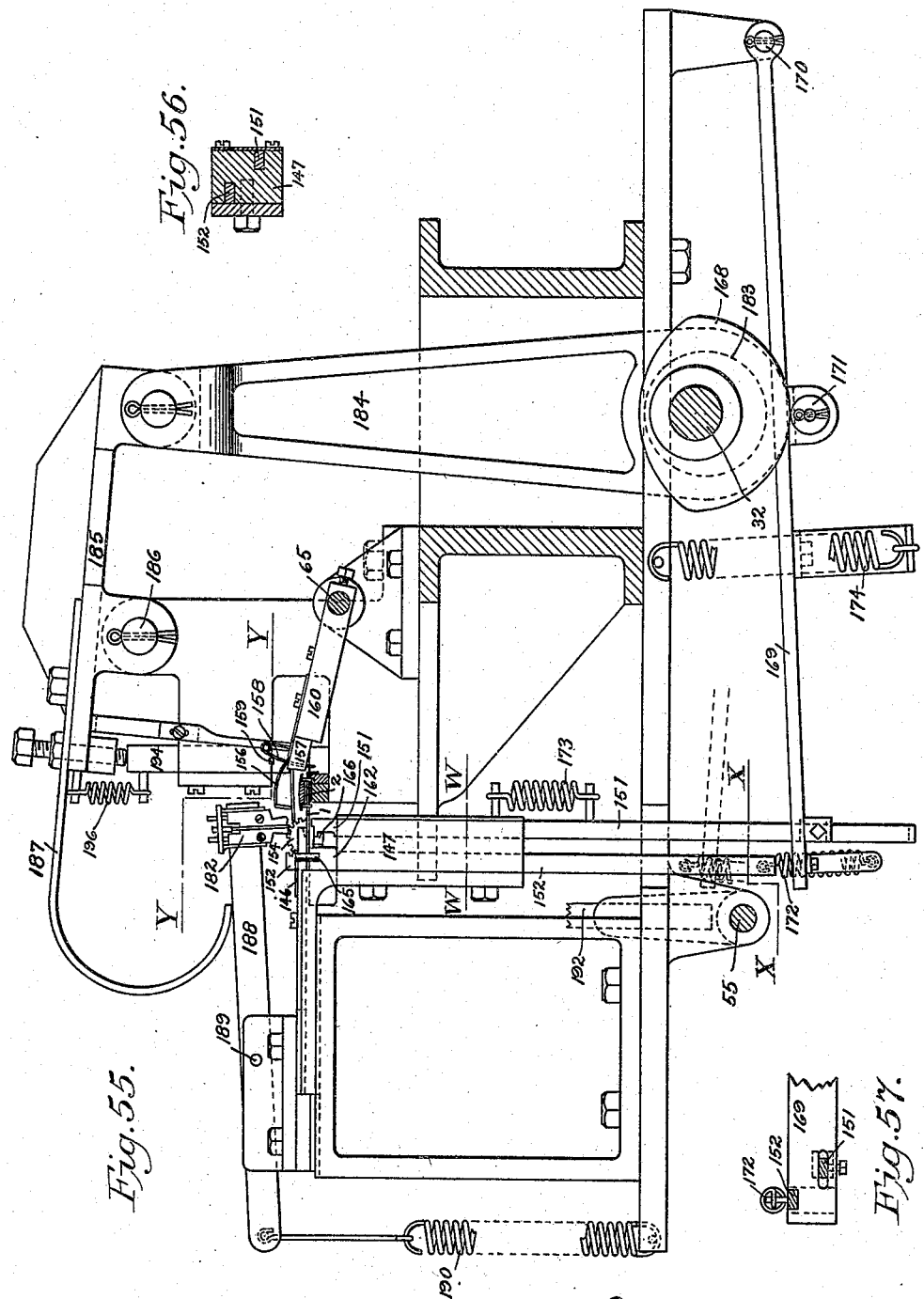

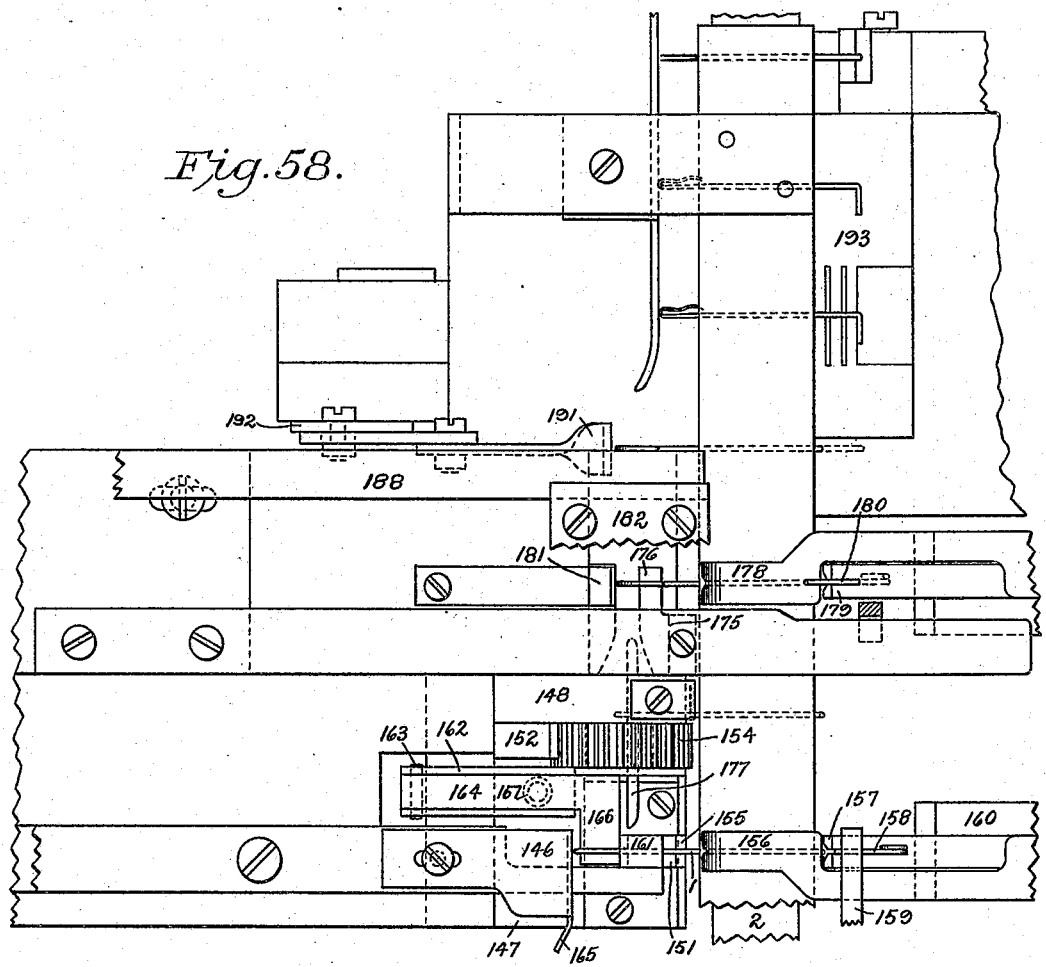
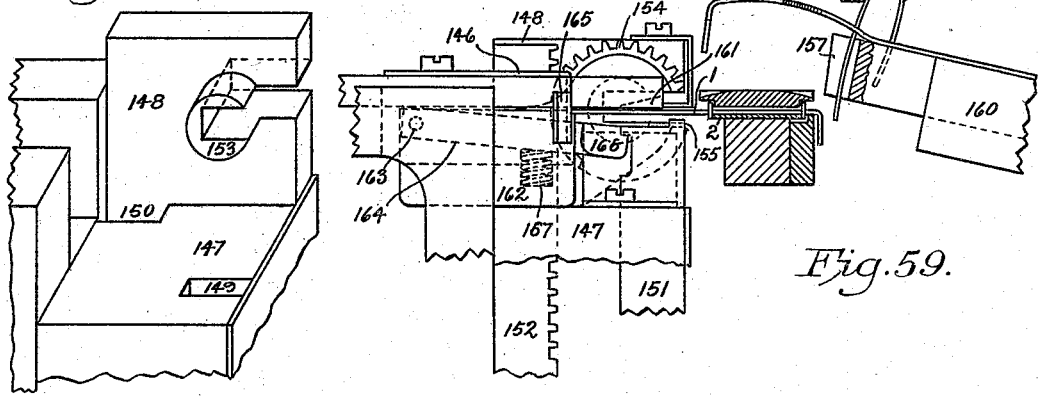

J. MAITLAND, DEC'D.
I. MAITLAND, EXECUTRIX.
MACHINE FOR MAKING SPRING KNITTING NEEDLES.
APPLICATION FILED OCT. 18, 1907.
930,978.
Patented Aug. 10, 1909.
16 SHEETS—SHEET 15.
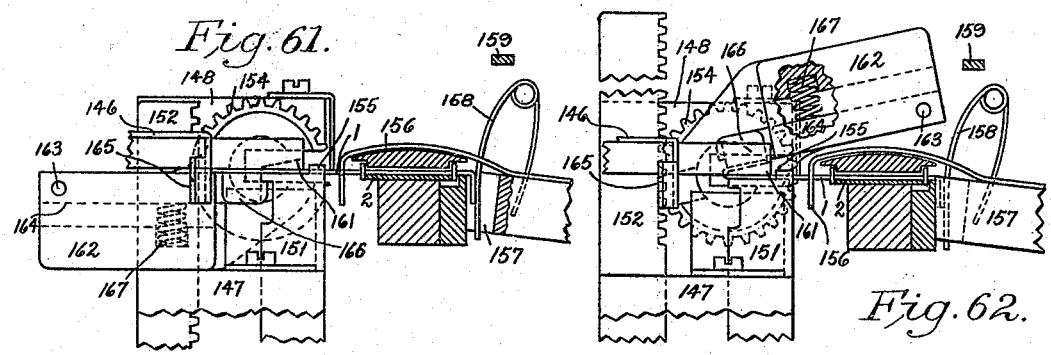
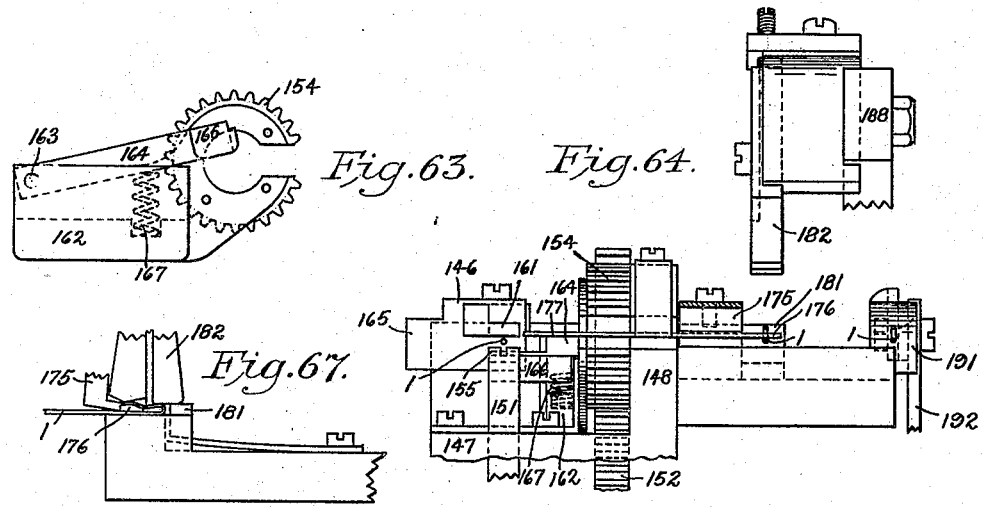
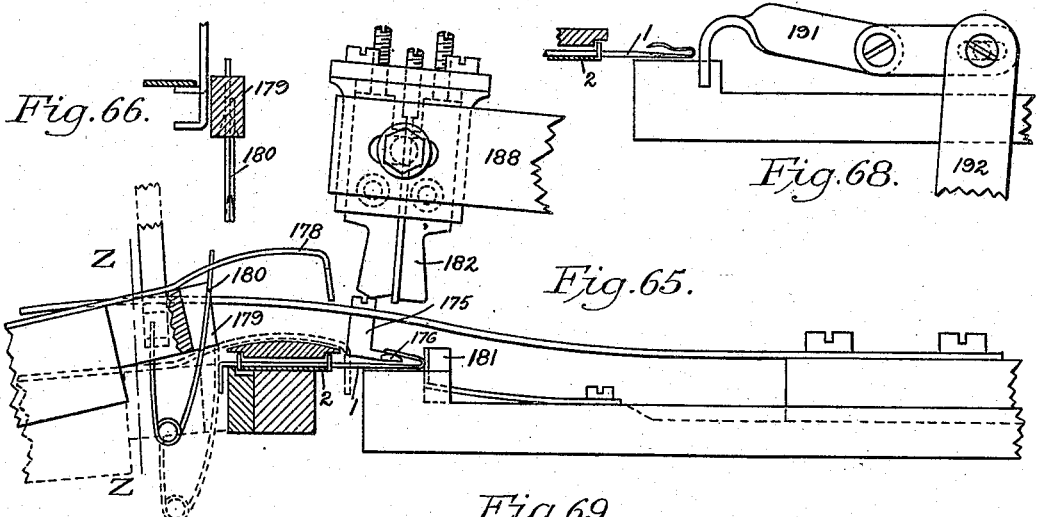
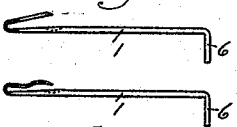
Witnesses:
John W. Fisher
Inventor,
John Maitland
By Walter E. Ward,
Attorney.

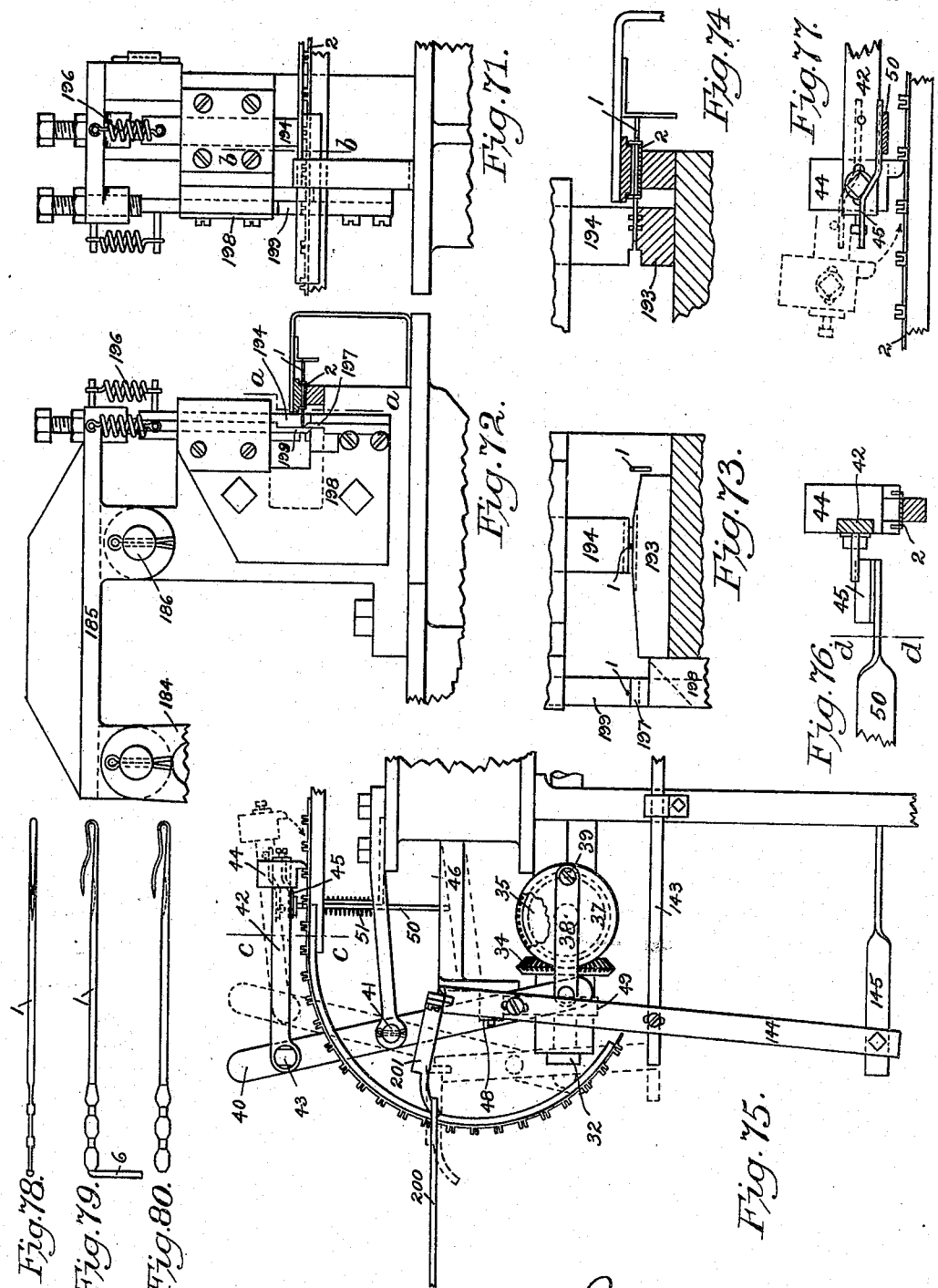

UNITED STATES PATENT OFFICE.

JOHN MAITLAND, OF COHOES, NEW YORK; IDA MAITLAND EXECUTRIX OF SAID JOHN MAITLAND, DECEASED.

MACHINE FOR MAKING SPRING KNITTING-NEEDLES.

No. 930,978.  Specification of Letters Patent.  Patented Aug. 10, 1909.

Application filed October 18, 1907. Serial No. 398,083.

*To all whom it may concern:*

Be it known that I, JOHN MAITLAND, a citizen of the United States, residing at the city of Cohoes, in the county of Albany and State of New York, have invented certain new and useful Improvements in Machines for Making Spring Knitting-Needles, of which the following is a specification.

My invention relates to the manufacture of spring knitting needles, of the type used in knitting machines, and the object of my invention is to construct a machine into which the wire may be fed at one end, cut off at suitable lengths and the needle blanks carried automatically along through the machine and subjected to successive processes of milling, punching the eye hole, grinding, sharpening, shaping and flattening, and discharged at the other end of the machine finished needles. I accomplish this object by means of the mechanism illustrated in the accompanying drawings, in which:

Figure 1 is a plan view of my machine. Fig. 2 is a side view of my machine, showing the operating side. Fig. 3 is a front view of the needle band and its supports, other parts omitted. Fig. 4 is an isometrical view of a portion of the needle band. Fig. 5 is a side view of my machine, showing the driving side. Fig. 6 is an end view of the feeding end. Fig. 7 is an end view of the finishing end. Fig. 8 is an enlarged plan view of a part of my machine, at the feeding end. Fig. 9 is an enlarged plan view of the remaining portion of my machine at the finishing end. Figs. 10 and 11 are enlarged cross sections on line A—A of Fig. 8; Fig. 10 showing the bending and cutting device in a raised position and Fig. 11 showing the same in a lowered position. Fig. 12 is a cross section on line B—B Fig. 10. Fig. 13 is an enlarged side view of the cutting device. Fig. 14 is an enlarged plan view of the cams and levers operating the bending and cutting devices. Fig. 15 is a horizontal cross section on line C—C Fig. 14. Fig. 16 is a horizontal cross section on line D—D Fig. 14. Fig. 17 is a detail plan view of the wire guide and part of the needle band. Fig. 18 is a front view of the wire guide and part of the needle band. Fig. 19 is a cross section on line E—E Fig. 17. Fig. 20 is a cross section on line F—F Fig. 17. Fig. 21 is a view of the needle blank as it appears after the bending and cutting. Fig. 22 is an enlarged cross section on line G—G Fig. 8. Fig. 23 is a horizontal section on line H—H Fig. 22. Fig. 24 is a detail plan view showing a portion of needle band, and device showing the needle lengthwise. Figs. 25 and 26 are detail cross sections showing the operation of the milling device. Fig. 27 is an inverted plan view of the end of the holding finger. Fig. 28 is a view of needle as it appears after the milling operation. Fig. 29 is an enlarged cross section on line J—J Fig. 5. Figs. 30, 31 and 32 are detail plan views showing the needle guides. Fig. 33 is a cross section on line K—K Fig. 30. Fig. 34 is a front view of the needle guide. Fig. 35 is a cross section on line L—L Fig. 31. Fig. 36 is an enlarged cross section on line M—M Fig. 8. Fig. 37 is a front view of the eye punch. Fig. 38 is a horizontal section on line N—N Fig. 36. Fig. 39 is a detail cross section showing the punch and holding finger in a raised position. Fig. 40 is a vertical section on line O—O Fig. 39. Figs. 41 and 42 are views of the needle as it appears after the eye is punched in it. Fig. 43 is an enlarged cross section on line P—P Fig. 9. Fig. 44 is a horizontal section on line Q—Q Fig. 43. Fig. 45 is a detail view showing operation of the 3rd grinder. Fig. 46 is a detail view showing operation of 2nd grinder. Fig. 47 is a vertical section on line R—R Fig. 46. Fig. 48 is a side view of the presser bar. Figs. 49, 50 and 51 are detail views showing the operation of 1st grinder. Fig. 52 is a vertical section on line S—S Fig. 49. Fig. 53 is a vertical section on line T—T Fig. 50. Fig. 54 is a vertical section on line U—U Fig. 49. Fig. 55 is an enlarged cross section on line V—V Fig. 9. Fig. 56 is a horizontal section on line W—W Fig. 55. Fig. 57 is a horizontal section on line X—X Fig. 55. Fig. 58 is an enlarged horizontal section on line Y—Y Fig. 55. Fig. 59 is a side view of the beard turning device. Fig. 60 is an isometrical view of the beard turning device support. Figs. 61 and 62 are detail side views of beard turning device. Fig. 63 is a detached side view of beard turner. Fig. 64 is an end view of the beard turning and shaping device. Fig. 65 is a side view of the beard shaping device. Fig. 66 is a section on line Z—Z Fig. 65. Fig. 67 is a detail side view showing the manner in which the beard is shaped. Fig. 68 is a side view of a needle shover. Figs. 69 and 70 are views of needles as they appear after having been operated upon respectively by the beard turning and shaping devices. Fig. 71 is an enlarged front view of the flattening and cutting devices. Fig. 72 is a side view of the flattening and cutting devices. Fig. 73 is an enlarged vertical cross section on line a—a Fig. 72. Fig. 74 is an enlarged vertical transverse section on line b—b Fig. 71. Fig. 75 is an enlarged side view of the needle band moving mechanism. Fig. 76 is an enlarged section on line c—c Fig. 75. Fig. 77 is an enlarged section on line d—d Fig. 76. Figs. 78 and 79 are enlarged views of the needle after being flattened. Fig. 80 is an enlarged view of the finished needle.

Similar numerals refer to similar parts throughout the several views.

In describing my machine, I will call the operating side of the machine, shown in Fig. 2, on which side the operations in making the needle take place, the front of the machine. The side shown in Fig. 5, which I have called the driving side and from which the movements of the various operating devices are driven, I will call the rear of the machine.

Referring to Fig. 1, the wire from which the needles are made is fed into the front of the machine by a bobbin or reel as usually used in wire drawing factories by which it may be kept straight and fed at the proper lengths and times. After the wire is fed into the machine it is bent down on one end forming a shank, as shown in Fig. 21. The needle blank is designated as 1. An endless band, 2, is carried around the entire front part of the machine. At equal spaces in the endless band, 2, are the notches 3, as shown in Fig. 4. The needle blanks, as soon as they are cut from the wire, are dropped automatically in the notches 3, in the endless band, 2, and are carried through the machine in said notches. The movement of this endless band is so timed that it will present each needle at the proper time and place for each operation in the movement of the machine, and all of the movements of the machine are synchronized, so that no operation will take place while the band is moving, and the band will lie still three-fourths of the time and will present a needle at the proper time and place for each operation of the machine, and when the needle is finished will deposit it on the table at the end of the machine, complete in finish and form. The shank of the needle blank is for the purpose of holding it firmly by devices for that purpose, during the various operations, and for other purposes as will more fully appear.

The principal operations in making the needle after the blank is cut from the wire, are the milling by which a portion is cut down, producing a flattened surface, and reducing it to the proper shape and thickness, which is done by two or more milling wheels, the band carrying the needle from one milling wheel to the next. The needle is then carried under the punch and is held firmly while the eye is punched into the needle. The needle is then carried along to the grinders, where it is revolved while the grinding takes place. As many grinders may be used as are necessary to reduce the needle to proper form. It is then carried along to the bender where the point is bent over the eye and then to the shaper, where the beard is reduced to the proper shape. The body of the needle is then flattened and the sides corrugated. The shank is then cut off and the needle discharged on the end of the table in a finished form. These several operations will be successfully described.

As already stated, the wire is fed into the machine by any suitable means arranged to feed it in proper lengths and at proper times.

Referring to Figs. 10, 11 and 12, 4 is a lever pivoted at 5 to the side of the bracket 14. This lever is called the bending lever and is for the purpose of bending the wire and forming the shank, 6, as shown in Fig. 21. This is done by the wire being fed into the machine, as shown in Fig. 10, over the block, 7, leaving a sufficient length extending over the edge of the block, 7, to form the shank, 6.

10 is a projection or block on the end of the lever 4; 28 is an arm also pivoted at one end at 29, to the bracket 14.

8 is an adjusting screw in arm, 28, by which said arm rests upon the end of lever 4.

30 is a spring holding the arm, 28, firmly against the principal part of the lever 4. 9 is a block attached to said arm, 28, and arranged so that when one end of the lever 4, carrying the block 10 descends, the spring will cause the bracket, 29, and block, 9, to also descend until the block 9 rests upon the wire over the block 7 and holds the wire firmly upon the block 7, when the end of the lever 4 continues to descend and the block 10 coming into contact with the end of the wire bends it down over the block, 7, forming the shank, 6. When the end of the lever 4 ascends, it will come in contact with the end of the said screw, 8, and raise the arm, 28, and the block, 9, so as to release the wire. But before this is done, the lever, 12, turning upon the pivot, 13, will bring down the cutting knife, 11, and will cut the wire off at the desired length, working against the stationary cutting knife, 15. The cutting knife, 11, is mounted upon the lever 12, adjustably, so as to provide for the cutting of the needle blanks of desired lengths by regulating the time of the stroke by the screw as shown in Fig. 13. The levers, 4 and 12, are operated by cams and intermediate connections from the driving shaft under the machine.

32 is the principal driving shaft running the entire length of the machine.

33 is an auxiliary shaft, receiving its motion from the principal shaft, 32, and operating certain parts of the machine.

19 is a cam attached to the shaft, 32.

20 is a roller held by a spring in contact with the cam 19. The roller 20 is mounted upon the end of the arm 21.

21 is an arm attached to the rocking shaft, 18.

18 is a rocking shaft operating the arm 17, and 17 is the arm connecting the rocking shaft with the rod, 16, which is attached to lever, 4, so that when the shaft, 32, revolves the arm, 21, will turn the rocking shaft, 18, partly around. This will raise the connecting rod, 16, by means of the arm, 17, and will operate the lever, 4, which is the bending lever, so as to bend the wire, forming the shank, 6, of the needle blank. At the same time the cam, 22, by means of the roller 23, the arm, 24, and rocking shaft, 25, and connecting arm, 26, the rod, 14, and the lever, 12, operates, the cutter, 11. This is adjusted to operate so that the wire will be cut while the blocks, 7, 9 and 10, still hold the wire upon the block 7, and as the lever, 4, releases the blocks, 9 and 10, from the wire on block, 7, the endless band, 2, will move, carrying the needle blank for the next operation. The endless band, 2, is so adjusted that the wire will be fed over the notches, 3, so that when the wire is cut the needle blank will lie in the notch, 3, and be carried along by the endless band. In order that the wire may enter into the notches, 3, I provide the guide, 27, as shown in Figs. 17, 18 and 19, somewhat of a funnel shape, so that as the wire is fed into the machine, it will drop into the notches as desired.

The endless band is moved by mechanism located at the finishing end.

34 is a beveled gear mounted upon the shaft 32.

35 is a beveled gear wheel meshing with the beveled gear wheel 34 and mounted fixedly on a smaller shaft, 36, at right angles with shaft 32. 37 is a crank disk mounted upon said shaft 36.

38 is a link attached by a pivot, 39, to one side of the disk 37, so that when the disk 37 revolves, it will move the link 38 horizontally backward and forward.

40 is a lever pivoted at 41, and attached to the link 38, so that when the disk 37 revolves, it will operate said lever. 42 is a dog attached to the other end of said lever by the pivot 43. 44 is the head of said dog, having a shoulder or tooth adapted to engage the projections forming the notches upon the endless band, as shown in Fig. 75.

45 is a plate located under the dog, 42, and adapted, when raised, to lift the dog free from the projections upon the endless band, 2.

46 is a lever pivoted at 47 to some portion of the frame of the machine.

48 is a roller upon the end of the lever 46.

49 is a cam mounted upon the shaft 32 and so located that at each revolution, the large part of the cam will come in contact with the roller, 48, and operate the lever 46.

50 is a lever, one end of which operates the plate 45. This lever 50 is pivoted near the center to a substantial part of the machine as shown in Fig. 9. 51 is a spring attached to said lever upon the opposite side of the pivot from said plate 45, and adapted to raise said plate and hold said dog free from said endless band. Said parts operate said endless band as follows: As the shaft, 32, revolves the beveled gear 34 operates the gear 35. Each turn operates the crank disk, 37, and also operates the lever 40 and pushes the dog 42 in the position of the dotted lines shown in Fig. 75. In the meanwhile, as the cam 49, revolves at the same time it operates the lever 46 so as to lower the plate 45 which allows the head of the dog to engage the endless band and, as the disk 37 continues to revolve, it moves the endless band a distance equal to the distance between two sets of notches, or one space. The cam and other parts are so timed and arranged that the dog will move the endless band one space at each revolution. The various operations in the construction of the needle must necessarily take place while the band is at rest. Therefore the dog, 42, is so arranged that the head of the dog will not engage the band for the first half of its forward movement. While it goes back the space of two notches it is held by the plate 45 away from the band long enough to only engage the band for a sufficient part of its forward movement to move the band a single space. This is done by the proper adjustment of the cam 49. Then the band remains stationary substantially three-fourths of the time and is in motion only one-fourth of the time. After the needle blank has been cut off and the shank turned down, as above described, the endless band carries the needle blank to the millers. There may be as many millers as desired to grind off one side of the needle flat and for the desired length. I preferably use six millers. These millers are designated 53 in the drawing. As the needle comes under the first miller a post, 64, holds the needle firm against the under side of the miller, and the finger, 63, engages the shank of the needle and keeps the needle from turning, and the two hold the needle firmly while being milled. The second miller is two spaces beyond the first miller and the endless band moves the needle one space and allows the needle to stop between the two millers and while in this position the shover, 61, engages the end of the needle and shoves it lengthwise in the notches of the endless band, a sufficient distance so that the second miller will mill the side of the needle at the point where the first miller left off, and in this way as many successive millers may be used as desired to continue the milling of the needle as far as desired.

The operation of these parts is as follows: Special reference being made to Figs. 22 to 27, inclusive, as well as Figs. 5 and 8. The finger, 63, is operated from the cam, 67, which is mounted upon the shaft, 32. The post, 68, has a roller, 69, mounted in the lower end of it, and this roller, 69, is held in contact with the cam, 67, by the spring, 70. When the roller, 69, is in contact with the small side of the cam, 67, the finger, 63, will be in the raised position, as shown in Fig. 25. The end of finger, 63, is provided with a groove or recess which fits upon the shank of the needle. As the cam, 67, revolves it raises the post, 68, which raises the end of the arm, 71, said arm being extended from a plate, 72, which is secured to the rocking shaft, 65, which rocks in the supports, 66. Attached to said plate, 72, are as many fingers, 63, as there are millers, and as the post, 68, is raised by the cam, 67, it rocks the shaft, 65, so as to lower the plate, 72, carrying the fingers, 63. The movement of the cam is so regulated that as the needle comes under the miller the finger will descend and grasp the shank of the needle and hold it firmly while the milling operation takes place, and as the shaft, 32, continues to revolve the finger will release the needle in time for the next movement of the endless band. At the same time while the finger is holding the needle under the miller the post, 64, is holding the needle firmly against the under side of the miller. The post, 64, is operated by the cam, 73, which is also mounted upon the shaft, 32, and operates the arm, 74, which rocks on the shaft, 77. The extension or lug, 78, of the arm 74, is provided with a set screw, 79, which acts against the under side of the plate, 80. Attached to the plate, 80, is the plate, 81, and attached to the plate, 81, are as many posts, 64, as there are millers. Said posts being adjustable by means of the set screws, 82. The arm, 74, is provided with a spring, 85, upon which rests the block, 75, in the end of which is mounted the roller, 76, which is held in contact with the cam, 73, by the spring, 83. 84 is a set screw for the purpose of adjusting the position of the arm, 74, so as to regulate the length of time the post, 64, holds the needle against the miller.

When the roller, 76, is in contact with the small side of the cam, 73, the post, 64, will be away from the needle, as shown in Fig. 25. As the cam revolves and the large part of the cam comes in contact with the roller, 76, it will press down the arm, 75, and the arm, 74, which will turn on the rocking shaft, 77, and elevate the lug, 78, which will raise the post, 80, carrying the plate, 81, and the block, 64, and the block, 64, will hold the needle firmly against the miller, as shown in Fig. 26. It is obvious that the pressure of the block, 64, against the needle must be very nicely adjusted, since the needle is so thin that if the block, 64, should press it a little too long the miller would grind away the entire needle. This adjustment is regulated by the spring, 85, and the set screw, 84, as above stated. The larger side of the cam, 73, increases slightly as the cam revolves upon the roller, 76, so as to keep the pressure of the block, 64, continuous as the miller cuts, and raises the block, 64, very slightly as the miller revolves. The movement is adjusted to take place while the needle is under the miller, the same as when the finger comes down to hold the needle in place.

The millers are mounted upon the shaft, 52, which is mounted in bearings, 54, 54, and is driven by power independent from the rest of the machinery.

As the endless band moves the needle from the middle it moves it one space, and stops before it reaches the next miller, and during that stop the shover, 61, moves the needle along far enough for the next miller to operate upon it. This shover is operated by cam, 57, mounted upon the main shaft, 32, which cam operates the arm 58, as shown in Fig. 29, which operates the rocking shaft, 55. Attached to the rocking shaft, 55, is the arm, 56. Attached to the arm, 56, is the spring, 59, which holds the arm, 58 against the cam, 57. Mounted upon the arm, 56, is the plate, 60, and attached to the plate, 60, are as many shovels, 61, as are necessary to move the needles along for each succeeding miller. Each one of these shovels has an end bent up, 62, as shown in Fig. 22, so arranged that cam, 57, will operate the arm, 58, and press the shover against the needle, while it is between the two millers and while the band is at rest, and move the needle along as far as desired.

After the needles have been milled they are carried by the endless band to the cutter for eyes to be punched or cut in the needles. The punch may be of any desirable form, but I preferably use a wheel, 86, located in the lower end of post, 87, which is secured in the vertical or front part of rocking plate, 88, which is mounted on the shaft, 89. This plate is operated by the eccentric, 90, which is mounted upon the main shaft, 32.

91 is an arm attached to the eccentric, 90, and connects it with the rocking plate, 88, by means of the pin, 92, so that as the shaft, 32, revolves it carries the eccentric, 90, with it, which operates the arm, 91, which operates the rocking plate, 88, and when the upper part of the eccentric is raised it makes the cutter or punch, 86, descend and punch a hole in the needle.

93 is a set screw by which the post, 87, carrying the cutter is adjusted, so that the cutter will cut the exact depth desired. As the needle passes under the cutter it must of necessity be held firmly and on secure foundation for the cutter to punch the eyehole. For this purpose I provide a foundation block, 94, under the cutter. Upon this block I provide two other blocks, slightly movable sidewise, 95 and 96, shown in Fig. 38, leaving a space between them under the cutter. In the space I place a third block, 97, containing a groove of proper size for the needle to rest in and adjusted to be exactly under the cutter. In order to adjust these blocks I provide set screws, 98 and 99, by which the block, 97, with the groove therein may be adjusted, so as to be exactly under the cutter.

Attached to the post carrying the cutter I provide a finger, 100, the lower end of which being slightly below the cutter, and so adjusted that when the cutter descends the finger, 100, will come down and engage the needle before the cutter reaches it, and press the needle firmly into the groove in the block, 97, so that the cutter may, when pressing down upon the needle with sufficient power to punch an eye-hole in the needle, not bend or warp the needle. At the same time I provide the finger, 101, which is attached to the same rocking shaft, 65, that the other fingers are attached to, which hold the needles while being milled. This finger is exactly the same as said milling fingers, and, being secured to the same rocking shaft, operates at the same time and in the same manner. This finger comes down upon the shank of the needle and holds it firmly while the eye is being punched in. Attached to this finger, 101, I have another finger, 102, which is of the same construction as the finger, 100, and comes down upon the needle on the opposite side of the cutter from the finger, 100, so as to assist in holding the needle perfectly solid and secure while the eye-hole is being punched therein. I also attach to the finger, 101, another finger, 103, from the lower side, to raise the needle out of the groove of the block, 97, after the eye-hole is punched in, so that the endless band can carry the needle along for further operation. The end of the finger, 103, coming in contact with the lower side of the needle raises the needle just enough to allow it to escape the groove in the movement of the endless band, the end of the finger, 103, being blunt or rounding so as not to detain the needle but simply lift it out of the groove.

After the eye-hole is punched into the needle the next operation is the grinding of the needle to make it smooth and of proper size and with a proper point. This grinding is done by a series of emery bands, 104. There may be as many of these bands as desired. In practice I preferably use three emery bands for grinding the needles. These emery bands travel around idle pulleys, 105, mounted upon brackets under the path of the endless band carrying the needles, and the emery bands are operated from power outside of the machine, and are adjusted to run under needles in the needle band at suitable intervals while the band is at rest.

I provide a smooth plate, 106, located under the needle to be ground, over which plate the emery band runs as it passes from over the loose pulley, 105. This plate, 106, is mounted upon a block, 107, which is mounted upon the stud, 108, which is adjusted by the set screw, 109, so as to have the plate come up at the proper angle under the emery band. This block, 107, is mounted upon an arm, 110. The arm, 110, is mounted loosely upon the rocking shaft, 111. The arm, 110, is not straight but one portion of the arm extends backwardly beyond the shaft, 111, as shown in Fig. 43. Secured to the shaft, 111, by means of the sleeve, 112, is the arm, 113. This arm, 113, operates the arm 110, by means of the pin, 114, attached to the collars, 116, which are secured to the said shaft, 111, the pin 114 operating against the arm, 110, directly, as shown in Fig. 43, or indirectly by means of other pins, 115, as shown in Fig. 9, attached to sleeves, 202, which are loosely mounted upon said shaft, 111. Said sleeves, 202, being attached to the arms 110.

117 is a spring attached to one end of the arm, 110, and to some stationary part of the machine, by which the plate, 106, is raised, and held against the emery band, and presses the emery band against the needle when the arm, 113, ceases to operate it in the opposite direction. The arm, 113, is operated from the cam, 49, mounted upon the shaft, 32, as shown in Fig. 5. This cam operates the arm 46, as hereinbefore described, and when the large part of the cam comes in contact with the end of arm, 46, and raises that end of the arm, the arm turns upon the pivot, 47, and as the other end of the arm descends it draws down the connecting rod, 118, which draws down the arm, 113, and brings the pin, 114, in contact with the arm, 110, and presses that arm carrying the plate, 106, downward away from the needle, and so carries the emery band away from contact with the needle, and as the cam, 49, continues to revolve, so that the large part of the cam is no longer in contact with the arm, 46, the spring, 117, acting upon the end of the arm, 110, rocks said arm upon the shaft, 111, raising the other end of the arm and the plate, 106, thereby carrying the emery band against the needle. The emery band is usually wider than the space between two needles, and has a band shifter, hereinafter described, which moves the band so that it is under three needles during the operation, one on each side of the needle which is being ground.

In order to prevent the band from grinding the other needles I attach to the arm, 110, the fingers, 119, extending under the ends of the needles, and adjusted so that a finger will be under a needle, each side of the needle being ground. So that as the needle band carries the needle over the emery band to be ground one finger, 119, will be under each adjoining needle and raise it enough to clear the emery band, so that the grinding will be simply upon the one needle.

In order to hold the needle firmly upon the band while being ground, and at the proper position, I arrange the post, 120, so as to have it exactly over the needle being ground, and in the position so that when the plate, 106, raises the emery band against the needle the post, 120, will hold the needle firmly upon the band, and keep the needle steady. The post, 120, is mounted upon the arm, 121, which is mounted upon the shaft, 122. Attached to this arm is another upright arm, 123, and a horizontal arm, 124, which carries the weight, 125, which weight is slidably adjustable upon said arm, 124, so that the pressure exerted by post 120, upon the needle may be regulated as desired, and that the post, 120, will not be rigid upon the needle while being ground, but will give as may be necessary for the irregularities of the needle and to make up for the amount ground off from the needle. I also provide the set screw, 126, by which the distance which the post, 120, will extend down may be adjusted. This set screw is attached to the arm, 123, and rests upon a stationary part of the machine when at rest, but when the plate, 106, presses the emery band against the under side of the needle it will raise the post, 120, and the arm, 123, so that the weight will rest upon the needle and the set screw will be clear from contact with the stationary part of the machine.

In practice I find it advisable to grind the needle first farthest from the point by the first emery band, and then grind a broader space and taper the needle with the second emery band, and grind the point with the third emery band. For this reason I make the post, 120, at the first emery band narrow, as shown in Figs. 49, 50 and 51, and make the post for the second grinding much broader and adjustable, as shown in Figs. 46, 47 and 48, and the post, 120, at the third emery band, which grinds the point, narrow and adjustable. The post at the first grinding does not need to be adjustable, but at the second grinding, where it is desired to taper the needle, as well as to grind the needle for a broader space, I make the post broader at the bottom and adjustable at the point of contact with the needle, as shown in Figs. 46, 47 and 48. This is done by mounting the post upon another arm by a set screw, 127, in an elongated slot, 128. In this way the amount of taper may be adjusted. Also at the last grinding I mount the post, 120, so that it may be adjusted longitudinally by the set screws, 129, in the elongated slot, 130, so that the post may be adjusted for the different lengths of needles to grind each one at the point.

While the needle is being ground, in order to have it ground evenly on all sides I provide a device for revolving it. This is done by the shaft, 131, in one end of which is the pin, 132, which, as the shaft revolves, catches upon the bent shank of the needle and revolves the needle with it. This shaft is operated by the belts, 133, operated by the shaft, 33, above described, and may be revolved in either direction.

In practice I revolve the first shaft in one direction and the other two shafts toward each other for convenience in operation. The shaft, 33, is continuously in operation and operates the belts, 133, continuously, but the shaft, 131, should not revolve while the needle band is moving from one space to the next, as it would interfere with the movement of the needle, and also the needle should be held true while it is to be revolved. I do this by means of the finger, 134, at the end of the arm, 135. The arm, 135, is operated by the rocking shaft, 65, above described, which operates the fingers for holding the needle during the milling operation, as above described. As the shaft rocks toward the needle the finger, 134, descends over the needle beyond the bent shank of the needle, so that the needle lies in the notch, 136, shown in Figs. 52 and 53, and the bent shank will be between the finger 134 and the revolving shaft, 131. The finger fits into the notches, 137, so as to rest secure. The shaft, 131, may be revolved and the pin, 132, engage the shank of the needle and revolve it freely, the needle resting in the meantime in the notch, 136, of the finger, 134. When the shaft, 65, rocks the other way it raises up the finger, 134, and releases the needle. At the same time the arm, 138, on the other side of the rocking shaft carries the dog, 139, down toward the revolving shaft, 131. 140 is a pin in a collar on the farther end of the shaft, 131, from the needle, in position to be engaged by the dog 139, carried by the arm, 138, so that as the rocking shaft, 65, rocks the other way, as stated, the dog, 139, will engage the pin, 140, and stop the shaft, 131, revolving and hold it stationary until released. The endless belts 133, slipping over their pulleys in the meantime. The dog, 139, is so adjusted that it will engage the pin, 140, and stop the shaft, 131, revolving before the finger, 134, releases the needle, so that as the finger, 134, releases the needle the shaft will be at rest and the endless band carrying the needle may be moved to the next space. The different parts being so adjusted that the plate, 106, will descend and leave the needle free to pass on to the next space at the same time. I also provide a belt shifter, so that the grinding by the emery bands will not be at the same place, but when the grinding commences the belt will shift a space equal to the width of the belt, so that the grinding will take place on the entire surface of the belt. I do this by means of the arms, 141, upon the end of each of which is the roller, 142, which comes in contact with each side of the belts. The arms, 141, are attached to the rod, 143, shown in Fig. 2. This rod is mounted in bearings on the under part of the machine, and is capable of being slid a limited distance longitudinally in each direction, so as to carry the arm, 141, and move the roller, 142, a sufficient distance to shift the belt the distance desired. The rod, 143, is attached to the lever, 144, which is pivoted at the lower end to arm, 145, and is operated by the lever, 40, above described, shown in Fig. 75. As the dog, 42, which operates the needle band, goes forward to get a new bite, as above described, it operates the lever, 40, upon the pivot, 41, the lower end of the lever, 40, being attached to the lever, 144, moves out the upper end of the lever, 144, in the position of the dotted lines, shown in Fig. 75. This will draw the rod, 143, in one direction and the reverse movement of said lever, as above described, will force the rod in the other direction, thus shifting the belt back and forth. Greater or less number of grinding belts may be used as desired, and operated in substantially the same way.

The next operation after the grinding is turning the pointed end over, forming the beard. After the needle has been ground by the grinders it is carried along by the needle band to block 147. When the grinders are through grinding the point extends outward beyond the band, and as it passes along to the block 147, the plate, 146, moves the needles back horizontally to a uniform position. Plate 146 is secured by a set screw in a slot, so that the distance which the needles may be moved can be regulated as shown in Fig. 58. The plate, 146, has a beveled side, 165, for the needles to come in contact with in their passage. 147 is a block having a perpendicular shoulder, 148, and also having a slot, 149, and another slot, 150. The post, 151, is mounted in the slot 149, and post, 152, in the slot, 150. The post, 151, is adapted to be moved upward for the upper surface to rest against the lower side of the needle, and has a shoulder, 155, in which there is a notch for the needle to rest in, for the purpose of holding the needle firm and steady while the point is being bent over.

In the upright shoulder, 148, is a stud, 153, and mounted upon this stud is a pinion, 154, having teeth which mesh with corresponding teeth in the post, 152. The shoulder, 148, including the stud, 153, and the pinion, 154, are provided with a slot, so that the needle as it moves, after the end has been turned, passes through the slot in the pinion and stud and rests within the slot in the block.

Directly over the needle is a wedge shaped block, 161. This block is stationary.

Attached to the pinion, 154, is the box, 162, open at the top and partly at the ends. The turning arm, 164, having a shoulder 166 is pivotally mounted within said box upon the pivot, 163. As the needle passes within the slot it lies over the shoulder 166. The arm, 164, is pressed upward by the spring, 167.

As the needle comes at rest within the notch in the block it is held firmly by the fingers, 156, 157, which are attached to the arm, 160, and are operated in the same way by the rocking shaft, 65, as the other fingers, above described. 158 is a spring arranged to come in contact with the bent end of the needle to move it horizontally in the needle band to regulate its position during the operation. This spring is held away from the band when the arm, 160, is elevated, as by the plate, 159, and when the arm, 160, descends it is released from the plate and comes against the end of the needle. While the needle is held firmly in position, as described, the rock, 152, is raised, the teeth meshing with the teeth of the pinion, 154, and adapted to turn said pinion and as this pinion revolves around the stud, 153, it carries with it the arm, 164, with the shoulder, 166, extending under the needle, and bends the needle over the wedge, 161, and leaves the needle in the form shown in Fig. 69. This rack or notched post, 152, is operated by cam, 168, mounted upon the main shaft, 32, by means of the arm, 169, which is hinged at one end, at 170, and has a bracket roller, 171, which comes in contact with the cam, 168. The other end of the arm, 169, is attached to the lower end of rack, 152, as shown in Fig. 55. The spring, 172, by which arm, 169, is attached to the rack, 152, allows that end of the arm, 169, to rise a slight distance before operating the rack, so as to allow the arm, 169, to permit the post, 151, to ascend against the lower side of the needle before the pinion operates to turn spring, 173, and comes in contact with the needle before the arm commences to raise the rack, 152. 174 is a spring by which the arm, 169, is kept in contact with the cam, 168, the spring being strong enough to raise the rack, 152, and operate the pinion, 154.

The next operation is the shaping of the beard, after it is bent over, so that it will have the desired form, as shown in Fig. 70. As the needle band moves along it next carries the needle under the block, 175, having a shoulder, 176, which extends between the bent end, forming the beard, and the body of the needle, as shown in Figs. 65 and 58.

177 is a strip which extends from over block, 161, where the bending takes place to the shoulder 176 of the block, 175, where the shaping takes place, and occupies the loop between the end of the beard and the body of the needle, to keep the needle in the proper upright position during its passage from one opening to the next and as the needle reaches the shoulder, 176, it passes from the strip, 177, upon the shoulder, 176, where it rests for the operation.

178 and 179 are fingers to hold the needle during the shaping operation, which are operated the same as the fingers before described. The spring, 180, pushes the needle along in position the same as the spring, 158, above described, except that it operates from below.

181 is the block against which the bend of the needle is pressed, in order to regulate the position for it to occupy during the operation.

182 is the former or shaper, the lower surface of which is constructed in the form and shape desired and regulated to press down upon the top of the beard when the needle has come to rest, in proper position, on the shoulder, 176, of the block, 175. This former is operated by an eccentric, 183, to which is attached the crank, 184, which operates the rocking plate, 185, upon the pivot, 186. Attached to this rocking plate 185 is the spring rod, 187, as shown in Fig. 55 which is bent to come in contact with the arm, 188, which carries the former, 182, so that as the shaft, 32, revolves the eccentric rocks the plate, 185, and as it carries down the spring band, 187, it presses the former, 182, down upon the beard of the needle, and presses it in the desired shape, as shown in Fig. 70. The arm, 188, is pivoted at 189 and has a spring, 190, attached to the other end, by which the former, 182, is raised from contact with the needle when the pressure of the spring bar 187, is removed.

After the beard of the needle is bent and shaped the next operation is pressing and shaping the end of the needle farthest from the point. To do this the needle band carries the needle one space beyond the shaper and stops there while the shover, 191, operates against the bend of the needle and shoves it along longitudinally in the needle band. This shover, 191, shown in Figs. 58 and 68 is attached to the arm, 192, by a slot and bolt, by which to adjust the distance at which the needle shall be shoved. The arm, 192, is attached to the rocking shaft, 55, and operated in the same manner as the shover, 61, above described. The needle band then carries the needle to the block, 193, shown in Figs. 73 and 74. The block, 193, has an inclined surface, as shown in Fig. 73, so that as the needle band carries the needle along the shank of the needle will strike the inclined side of the block, and as it is carried along the needle will turn, so that the shank will lie in a horizontal position when it reaches the top of the block. The parts are adjusted so that the needle will come to a rest on the top of the block, 193.

194 is a former post operated by the rocking plate, 185, and is held in contact with said plate by the spring, 196, and is adjusted so that when the rocking plate, 185, is operated by the eccentric, 183, as above described, it will press the former, 194, down upon the needle, and flatten out the needle and make the uneven sides or corrugations, as shown in Figs. 78 and 79. The surface of the block, 193, and the former, 194, having the proper configurations to produce the desired forms on the side of the needle. The endless band then carries the needle along to the cutter to cut off the bent shank. 197 is the lower blade of the cutter, which is stationary and suitably attached to the block, 198. 199 is the upper knife or cutter, and is operated by the rocking plate, 185, as shown in Figs. 71 and 72, so that when the endless band carries the needle over the blade 197 the rocking of the plate, 185, will cause the blade, 199, to descend upon and cut off the bent shank of the needle and leave the needle in the finished form shown in Fig. 80. The endless band then continues to carry the needle along to the table, 200, at the end of the machine. 201 is a bifurcated arm attached to the arm, 144, above described, and operated by it. The arm, 201, is double and has a shoulder, as shown in Fig. 75, one end of the arm 201 passes through slots in the table, 200. One side of the arm, 201, goes upon one side of the band, and the other side of said arm goes upon the other side of said band, and as the arm, 144, operates and takes the position shown in dotted lines in Fig. 75, the arm, 201, moves along, so that the shoulder of the arm strikes the needle at each side of the endless band, and shoves the needle out of the needle band upon the table, 200. This operation takes place at each movement of the needle band, so as to deposit each needle in turn upon the table in the complete, finished condition, without having been touched by the hands of the operator from the time the wire was fed into the machine at the starting point until the needle is completed in all respects and deposited at the table at the finishing end.

What I claim as my invention and desire to secure by Letters Patent is:

1. In a machine for making spring knitting needles, an endless carrier consisting of a thin flexible continuous metallic band having a series of upright posts on each side thereof, said posts being arranged in pairs on opposite sides of the band forming a series of notches, each notch adapted to hold one needle blank lying therein across the band at right angles with the center thereof, the ends of the needle blanks extending beyond the sides of the band, said endless band being adapted to carry needle blanks through the machine and present them successively at the proper times and places for the different operations in forming the needles, together with means for operating said endless band substantially as described.

2. In a machine for making knitting machine needles; a series of milling wheels adapted to successively mill off one side of each needle, an automatic carrier adapted to convey the needles to each miller successively, and means for automatically shoving said needles longitudinally in said carrier while passing from one miller to the next, whereby each successive miller will mill the needles farther along than the preceding miller.

3. In a machine for making needles for knitting machines; an automatic carrier adapted to convey the needle blanks through the machine; a punch adapted to punch an eye hole in each needle when conveyed under it by said carrier; a block having a groove adapted to contain the said needle while said eye is being punched in; means for adjusting said groove under said punch; means for operating said punch and causing it to descend upon said needle while it lies in said groove; a finger attached to said punch and extending slightly below the punch and adapted to press said needle in said groove and hold it firmly while the eye is being punched therein, another finger on the other side of said punch adapted to come in contact with and assist in holding said needle while the eye is being punched therein, a third finger adapted to raise said needle blank from said groove after the eye has been punched therein and the punch raised therefrom; thereby allowing said endless band to continue to convey said needle blank forward through said machine after the eye is punched therein; means for operating said last two named fingers substantially as described for the purposes set forth.

4. In a machine for making knitting machine needles; means for automatically feeding the wire into the machine; means for automatically cutting off the wire into needle blanks; means for bending one end of the needle blank into the form of a shank at right angles with the body of the needle blank; an endless band having notches therein, each notch being adapted to carry a needle blank through the machine; a punch adapted to punch eye holes in the needles when carried under it by said endless band; a block under said punch having a groove therein, adapted for the needle blank to fit therein while the eye is being punched in said needle; three fingers adapted to hold said needle blank while the eye is being punched therein, two on the top of said needle, one of which is on each side of the punch and one on the needle shank, whereby said needle will be held securely while the eye is being punched therein, a fourth finger adapted to raise said needle blank from said groove after the eye has been punched therein and means for operating said fingers substantially as described for the purposes set forth.

5. In a machine for making knitting machine needles a carrier adapted to convey the needles through the machine and automatically present them successively in various positions and places in said machine for the several operations of shaping and finishing the needles; means for operating said carrier; a series of milling wheels adapted to successively operate upon each of said needles; means for automatically shoving said needles longitudinally in said carrier while passing from one miller to the next; a punch adapted to punch an eye hole in each of said needles; a series of endless emery bands adapted to grind said needles as each needle is successively presented to the respective emery bands by said carrier; means for holding said needle upon said emery band while being ground and means for moving said needles in said carrier so that each needle as it is presented to the successive bands will be ground in different places on the needle, substantially as described.

6. In a machine for making knitting machine needles a carrier adapted to convey the needle blanks through the machine and automatically bring each blank separately to the various positions and places in the machine for the several operations in the construction of the needle; means for bending the end of each blank substantially at right angles with the body of the needle blank; emery bands adapted to grind said needles, shafts located near said emery bands and in planes parallel with the needle blanks in said endless bands, pins in the ends of said shafts outside of the center thereof adapted to engage the shank of the needle while being ground by the emery band; means for revolving said shaft while the needles are being ground by said emery band whereby said needle blanks are revolved while being ground, substantially as described for the purposes set forth.

7. In a machine for making knitting machine needles, an endless band having notches therein adapted to convey needle blanks through the machine; a series of endless emery bands adapted to grind said needles as they pass through the machine; means for bringing each needle to each emery band successively above said bands; means for pressing different portions of each needle on the successive emery bands whereby each band will grind different parts of each needle; fingers adapted to hold each needle while being ground, in the notch upon said endless band, in combination with a crank shaft adapted to revolve each needle while being ground.

8. In a machine for making knitting machine needles, a carrier adapted to convey the needles through the machine and automatically present each needle separately in the various positions and places to the machine for the several successive operations in the construction and formation of the needles; means for grinding the needles; a block having a slot therein and adapted to receive the ground end of each needle as it is carried by the said endless band; a movable shoulder located in said slot, the end of the needle being above said movable shoulder, a stationary wedge in said slot above said ground end of the needle; means for raising said movable shoulder and turning it with the ground end of the needle over said wedge, thereby forming the beard of the needle, substantially described.

9. In a machine for making knitting machine needles, a carrier adapted to convey the needles through the machine and automatically present each needle separately in the various positions and places in the machine for the several successive operations in the construction and formation of the needles; means for bending over the ends of the needle forming a loop; a shoulder adapted to occupy the space formed by said loop when the needle is carried along by said conveyer; said shoulder having the form and shape desired for the beard of the needle, a pressure foot located above said shoulder and shaped to conform thereto; means for pressing said pressure foot upon said bent end of the needle forming the beard, thereby shaping the beard in the form desired.

10. In a machine for making knitting machine needles, an endless band having notches therein, adapted to convey the needles through the machine and automatically present each needle separately in the various positions, and places in the machine for the several successive operations in the construction and formation of the needles; milling wheels adapted to mill said needles successively when presented by said endless band; a punch adapted to punch the eye in each of said needles carried under it by said endless band; grinders adapted to grind said needles; means for automatically bending over the ends of the needles and means for shaping said bent over ends into beards; a rocking shaft provided with a series of fingers adapted to hold said needles during the several operations of milling, punching the eye, grinding, bending and shaping the beard; means for operating said rocking shaft whereby said fingers will engage said needles and hold them during the several operations numerated; a table at the end of the machine adapted to receive the needles when finished and means for unloading the finished needles from said needle band to said table, substantially as described.

11. In a machine for making knitting machine needles, an endless band adapted to carry the needles through the machine and automatically present each needle in the various positions and places in the machine for the several operations in the construction and formation of the needles; milling wheels adapted to mill said needles, successively; shovers adapted to shove the needles longitudinally in said endless band while passing from one milling wheel to the next; a punch adapted to punch the eye in each of said needles successively; grinders adapted to grind and sharpen said needles; a turner adapted to bend over the sharpened ends of said needles; a shaper adapted to shape the beards of said needles; a former adapted to flatten the sides of the needles and form the corrugations thereon; a pusher adapted to push the needles from the endless band at the end of said machine, in combination with means for operating all of said parts in harmony with each other, whereby the movement of every part will synchronize with the movement of every other part in the construction and formation of said needles, substantially as described.

In testimony whereof I have affixed my signature in presence of two witnesses.

JOHN MAITLAND.

Witnesses:
LOTTIE PRIOR,
JOHN W. FISHER.